(12) United States Patent
Silver

(10) Patent No.: US 7,423,811 B2
(45) Date of Patent: *Sep. 9, 2008

(54) VARIABLE FOCUS OPTICAL DEVICES

(76) Inventor: Joshua David Silver, 61 Hurst Rise Road, Oxford OX2 9HE (GB)

(*) Notice: Subject to any disclaimer, the term of this patent is extended or adjusted under 35 U.S.C. 154(b) by 0 days.

This patent is subject to a terminal disclaimer.

(21) Appl. No.: 11/272,036

(22) Filed: Nov. 14, 2005

(65) Prior Publication Data

US 2006/0250699 A1 Nov. 9, 2006

Related U.S. Application Data

(60) Continuation of application No. 11/080,683, filed on Mar. 16, 2005, now abandoned, which is a continuation of application No. 10/883,963, filed on Jul. 6, 2004, now abandoned, which is a continuation of application No. 10/626,865, filed on Jul. 25, 2003, now abandoned, which is a division of application No. 09/646,392, filed as application No. PCT/GB99/00747 on Mar. 18, 1999, now Pat. No. 6,618,208.

(30) Foreign Application Priority Data

Mar. 19, 1998 (GB) .................................. 9805977.7

(51) Int. Cl.
G02B 1/06 (2006.01)
G02B 3/12 (2006.01)
(52) U.S. Cl. ........................ 359/666; 359/665
(58) Field of Classification Search ................ 351/159, 351/168, 169; 359/665, 666
See application file for complete search history.

(56) References Cited

U.S. PATENT DOCUMENTS

| 4,288,146 A | 9/1981 | Johnson, Jr. et al. |
| 4,721,378 A | 1/1988 | Volk |
| 4,834,512 A | 5/1989 | Austin |
| 5,463,223 A | 10/1995 | Wong et al. |
| 5,684,637 A * | 11/1997 | Floyd .......................... 359/666 |
| 6,069,742 A | 5/2000 | Silver |
| 6,188,525 B1 | 2/2001 | Silver |
| 6,404,560 B1 | 6/2002 | Hori |
| 6,618,208 B1 * | 9/2003 | Silver .......................... 359/665 |
| 2008/0007689 A1 * | 1/2008 | Silver .......................... 351/168 |

FOREIGN PATENT DOCUMENTS

| DE | 42 17 853 A1 | 12/1993 |
| EP | 0 291 596 A1 | 11/1988 |
| FR | 1 602 997 A | 3/1971 |
| GB | 1 327 503 A | 8/1973 |
| WO | WO 98 11458 A1 | 3/1998 |

\* cited by examiner

*Primary Examiner*—David N Spector
(74) *Attorney, Agent, or Firm*—Sughrue Mion, PLLC

(57) ABSTRACT

Variable focus optical devices, in particular lenses, can include a cavity at least partially defined by a flexible member (2), which may be retained between engaging portions of a frame member (8) and a ring member (12), such that a peripheral region of the membrane is caused to change direction more than twice. The engaging portions of the ring and frame may be high-friction surfaces. In addition, methods of filling a cavity of a lens with transparent fluid, methods of adjusting the pressure of fluid in the cavity, and methods of sealing such a cavity are described, as well the use of such lenses in adjustable spectacles.

55 Claims, 4 Drawing Sheets

VARIABLE FOCUS OPTICAL DEVICES

This is a Continuation of application Ser. No. 11/080,683 (filed Mar. 16, 2005) now abandoned; which is a Continuation of application Ser. No. 10/883,963 (filed Jul. 6, 2004), now abandoned; which is a Continuation of application Ser. No. 10/626,865 (filed Jul. 25, 2003), now abandoned; which is a Divisional of Application No. 09/646,392 (filed Jan. 19, 2001), now U.S. Pat. No. 6,168,208; which is a National Stage entry of International Application No. PCT/GB99/00747 (filed Mar. 18, 1999); the entire disclosures of each of which are incorporated herein by reference.

The present invention relates to improvements in the field of variable focus optical devices, in particular variable focus lenses, for example of the type in which the optical power of the lens is variable by varying the volume and/or pressure of a transparent fluid within a transparent envelope.

Variable focus lenses are known and have been described for example in GB 2183059, GB 2184562 and WO96/38744. However, to date, despite the many examples of variable focus lenses described in the prior art, none have achieved widespread commercial acceptance as an alternative to fixed-focus ground glass or plastic lenses.

It is believed that the failure of known variable focus lenses to gain commercial acceptance is due to a number of factors. For example, many known such lenses suffer from leakage of the fluid from the envelope in use. Furthermore, many known such lenses suffer from poor optical quality due to the mounting arrangement of the flexible membrane and/or the material chosen for the membrane. A further contributor to the poor optical quality of known lenses has been the fluid selected to fill the envelope, which has had a less than optimal transparency or homogeneity of refractive index. An additional reason for the non-acceptance of known lenses has been their complex and bulky configuration which has lead to a poor aesthetic effect, for example when the known lenses have been mounted in spectacles, and has also increased the cost of such spectacles to a level which is not competitive with traditional fixed-focus lenses.

The present invention seeks to provide a variable focus lens and a method of making a variable focus lens, embodiments of which overcome at least some of the problems of known variable focus lenses, whereby a more commercially attractive product can be achieved. It also seeks to provide eyewear incorporating variable focus lenses.

According to an invention disclosed herein, there is provided a variable focus lens comprising a transparent envelope at least partially defined by a flexible, transparent membrane and containing a transparent fluid, a frame member engaging one face of the flexible membrane and a ring member engaging an opposite face of the flexible membrane, the ring member and the frame member being urged towards each other by retaining means, wherein the respective surfaces of the frame member and the ring member that engage the flexible membrane are substantially complementary and profiled so as to cause a peripheral region of the flexible membrane to change direction more than once.

It has been realised by the applicant that, in order to obtain a high optical quality of the membrane, the membrane should be held under tension at all times. Furthermore, it has been found by the applicant that the membrane, when under tension, and particularly when formed of preferred materials such as Mylar tends to form its own seal against the frame member or ring member.

The profiles of the engaging surfaces of the frame member and the ring member allow the flexible membrane to be retained under tension on the frame member simply by the action of the engaging surfaces. In this way the construction of the variable focus lens is considerably simplified in comparison to known such lenses.

The profiles of the engaging surfaces may be stepped or comprise one or more projections and complementary recess(es). The portions of the engaging surfaces substantially perpendicular to the plane of the unstretched membrane will tend to frictionally engage the membrane as the ring member is urged towards the frame member by the retaining means. Such frictional engagement will tend to stretch the membrane on the frame member, ensuring that the membrane is under tension.

In a particularly advantageous arrangement, the engaging surfaces comprise at least one oblique surface which increases in radial extent towards the frame member. In this way, as the ring member is urged towards the frame member by the retaining means, friction between the oblique surface of the ring member and the flexible membrane tends to urge the periphery of the membrane radially outwardly, thereby increasing the tension in the membrane, i.e. stretching the membrane.

The ring member and frame member may be of a material or materials which is/are sufficiently rigid to positively interengage with each other and to ensure that the ring member and frame member can maintain the flexible membrane under tension. The material of the ring member and frame member is preferably also lightweight to facilitate the incorporation of lenses described herein in spectacles. Thus, the ring member and frame member may be made, for example, of a high impact resistant plastics material, or of aluminum, or of titanium.

It is generally advantageous to maximise the friction between the engaging surfaces and the membrane, not only to maximise the stretching effect described above, but also to ensure that the membrane is securely held by the ring member and the frame in the assembled lens. Preferably therefore, at least one of the surfaces is a high friction surface.

This in itself is believed to be new and thus according to an invention disclosed herein there is provided a variable focus lens comprising a transparent envelope at least partially defined by a flexible, transparent membrane and containing a transparent fluid, a frame member engaging one face of the flexible membrane and a ring member engaging an opposite face of the flexible membrane, the ring member and the frame member being urged towards each other by retaining means, wherein the respective surfaces of the frame member and the ring member that engage the flexible membrane are substantially complementary and at least one of the surfaces is a high friction surface.

For example, one or more of the frame member and the ring member may be made of a material having a high coefficient of friction at its surface. Alternatively, at least one of the engaging surfaces may have been roughened or expanded to increase its surface friction.

In a preferred arrangement, however, at least one of the engaging surfaces is provided with a coating of high friction material. A particularly preferred material for this coating is rubber or a synthetic elastomer, as this has been found by the applicant to engage well with the preferred materials for the membrane, such as Mylar.

A further advantage of providing at least one of the engaging surfaces with a coating of rubber or synthetic elastomer is that the rubber or elastomer tends to form a high integrity fluid seal at the interface between the engaging surface and the membrane.

Thus, according to an invention defined herein there is provided a variable focus lens comprising a transparent envelope at least partially defined by a flexible, transparent membrane and containing a transparent fluid, a frame member engaging one face of the flexible membrane and a ring member engaging an opposite face of the flexible membrane, the ring member and the frame member being urged towards each other by retaining means, wherein at least one of the engaging surfaces is provided with a coating of rubber or synthetic elastomer.

It has been found by the applicant that the coating need only be thin, in order to achieve an advantageous effect. For example, the coating may have thickness of less than 100 μm, or less than 50 μm, or less than 20 μm or even less than 10 μm.

Preferably, the coating is provided on the engaging surface that engages the face of the membrane which also forms an inner surface of the envelope, so that the sealing interface aids in the containment of the fluid. This surface will generally be provided on the frame member. Of course, both engaging surfaces may be provided with a coating.

The peripheral shape of the ring member, and also of the frame member, may be chosen as required. For example, the members may have a circular, oval, elliptical, or other closed curve, peripheral shape.

The frame member may comprise a rigid transparent window forming a wall of the envelope. The rigid window may be of any suitable material, for example glass, or a plastics material, such as polycarbonate. Indeed, for ease of manufacture, the frame member may be made entirely of such transparent material. Alternatively, the rigid window may form a part of the frame member, for example being bonded to and/or enclosed by an annular frame.

The frame member may be provided with a second engaging surface engaging a second membrane. In this case, a second ring member may be provided with a second engaging surface for engaging the second membrane. The second engaging surface may be opposed to the first engaging surface of the frame member. The second membrane may define a wall of the envelope.

Alternatively, the first ring member may be provided with a second engaging surface engaging a second membrane. Again, a second ring member may be provided with a second engaging surface for engaging the second membrane. The second engaging surface may be opposed to the first engaging surface of the first ring member. The second membrane may define a wall of the envelope.

The first and second membranes may be formed from a single membrane web, although preferably the first and second membranes are discrete.

A duct may be provided through a wall of the envelope, preferable a radially outer wall, which duct is in communication with the envelope. Such a duct will allow fluid to be removed from or introduced to the envelope in order that the volume and/or pressure of the fluid in the envelope may be varied to vary the power of the lens.

The duct may be formed by a pre-formed bore, or drilled, in one or more of the first or second ring members or the frame member.

The duct may be provided with suitable closure means to prevent leakage of fluid from the envelope through the duct. Such closure means may be as described in WO96/38744, or may be a rubber or elastomer bung penetrable by a needle of a syringe and capable of self-sealing on removal of the needle. Alternatively, a valve may be provided in the duct, arranged so that the duct is normally closed, but capable of being opened by, for example, the needle of a syringe. In one embodiment, the valve comprises a ball urged by a spring against an annular seat. To vary the pressure of fluid in the envelope, a needle of a syringe or similar is inserted through the centre of the seat, thus displacing the ball. Fluid can be then be introduced into or removed from the envelope to vary the pressure therein. When the needle is retracted, the spring urges the ball against the seat again to close the valve and seal the duct.

It has been found by the applicant that, with preferred transparent fluids such as silicone oil, which is relatively viscous, such a duct must be relatively large in order to enable efficient filling of the lens. One way in which the effective size of such a duct may be increased, is by providing a plurality of ducts in a wall of the envelope.

This in itself is believed to be new, and thus according to an invention disclosed herein, there is provided a variable focus lens comprising a transparent envelope at least partially defined by a flexible, transparent membrane and containing a transparent fluid, and a plurality of ducts provided in a wall of the envelope for introducing fluid into the envelope.

The plurality of ducts may be provided with respective closure means, for example as described above, or may be provided with a single closure means for a plurality of ducts. The ducts may be distributed about the periphery of the lens, but in a preferred arrangement the ducts are proximately grouped.

As an alternative to providing a plurality of ducts, it is possible to provide a single duct having a large cross-section. It will be appreciated that the maximum width of the duct in the direction of the axis of the lens is limited by the thickness of the wall of the envelope which forms the lens. However, the cross-sectional area of the duct can be increased by forming the duct such that its width perpendicular to the axis of the lens is greater than its width parallel to the axis of the lens.

The retaining means may be any suitable means, for example screws, clips and the like. Respective retaining means may be provided for each of said first and second ring members.

In a preferred arrangement, the retaining means take the form of a deformable portion of one of the frame member and the ring member, arranged to be deformed, for example crimped, over the other of the frame member and the ring member. In this case, the deformable portion may be of metal, such as aluminum, stainless steel or titanium.

Advantageously, the retaining means may be provided by a pair of spectacles or similar device, into which the lens is to be mounted.

The transparent fluid retained within the envelope may be any suitable fluid, for example silicone oil, such as 703 type silicone oil.

The fluid may be communicated to the envelope by means of a suitable pump, for example a syringe.

However, it has been realised by the applicant that a simple syringe is not ideal as a pump for varying the focus of the lens. One reason for this is that the plunger of the syringe is difficult to control accurately. For example, static friction between the piston and the syringe barrel must be overcome before the plunger moves, such that pressure applied to the plunger tends to build up until the static friction is overcome, at which point the plunger moves relatively rapidly.

Thus, according to an invention disclosed herein, there is provided a pump for a variable focus lens comprising a fluid chamber having an outlet port and a linearly movable member arranged to vary the effective volume of the fluid chamber, wherein locating means are provided for locating the movable member in a plurality of discrete positions.

In a simple arrangement the locating means may be in the form of two stops arranged to limit the movement of the movable member, for example a piston or plunger, to a range having end points defined by respective stops. The end points may correspond respectively to a first predetermined power of the lens, for example for the correction of myopia of a user, and a second predetermined power of the lens, for example for correction of hypermetropia or presbyopia of a user. In this way a bifocal lens may be produced which can be adjusted by the user for reading and close work or distance vision.

The stops may be variable in their positions, for example for initial setting of two levels of power for the lens, and may be lockable in a selected position.

The locating means may comprise a series of locators, for example teeth of a rack or the like, which may be engaged by a suitable mating member, in order that the movable member is adjustable step-wise.

It has also been found preferable by the applicant for users of variable focus lenses, for example users of spectacles incorporating variable focus lenses, to control the focus of the lenses by a rotational movement rather than a linear movement such as that of the piston of a syringe.

Thus, according to an invention disclosed herein, there is provided a pump for a variable focus lens comprising a fluid chamber having an outlet port and means for linearly varying the volume of the fluid chamber in response to a rotational movement of a control member.

The pump may comprise a pinion coupled for rotation with a control knob and engaging a rack coupled for linear movement to a piston provided in the fluid chamber. Alternatively, a piston received within the fluid chamber may be provided on a threaded shaft, the shaft engaging with a complementary threaded collar, such that the collar or the shaft may be rotated to cause the piston to move linearly within the fluid chamber. Alternatively, the interior of the fluid chamber may be threaded, and the periphery of the piston may be provided with a complementary thread such that rotation of the piston causes linear movement thereof within the fluid chamber.

In a presently preferred arrangement, a barrel member is provided having a threaded exterior, circumferential wall, and a fluid port defined in an end wall thereof. The barrel member is received within a cap member provided with a complementary interior thread and an end wall opposed to the end wall of the barrel member. The fluid chamber is defined by the volume enclosed by the connected barrel and cap members. According to this arrangement, as the cap member and barrel member are rotated relative to each other the cap moves away from or towards the end face of the barrel member, thereby linearly increasing or reducing the volume of the fluid chamber. The cap member may optionally be provided with a piston mounted in fixed relation to its end face and received within the barrel member. In this case, the fluid chamber is defined between the end face of the barrel member and the piston, and relative rotation of the barrel member and cap member causes the piston to reduce the effective volume of the fluid chamber.

Locating means as described above may be provided in the context of a rotational control member.

According to an invention disclosed herein, there is provided a variable focus lens in combination with a pump as described herein.

In a preferred arrangement, two variable focus lenses are provided in a spectacle frame. A single pump may be provided, although it is preferred for a respective pump to be provided for each lens, so that each lens is independently variable.

The pump(s) may be provided on the arms of the spectacle frames, for example at the ends of the arms, so that they are hidden by the ears in use.

Channels may be provided in the spectacle frame, for example in the arms, for fluid communication between the lenses and the pump(s).

The pump(s) may be arranged to be detachable from the spectacles, for example permanently detachable after an initial setting operation of the focus of the lenses. The pump(s) may be arranged to be detachable from the spectacles such that when the pump(s) is/are detached the fluid communication channels are automatically closed off, for example by means of a valve.

In a preferred embodiment, a pair of spectacles has two pumps, one for each lens, with each pump being removably attached to an arm of the spectacles. Fluid communication between each pump and its respective lens is achieved by means of flexible tubing extending from the pump to the lens. The flexible tubing is received in a channel in the frame of the spectacles for at least part of its length. When the user has set the focus of the lens, the tubing is closed and cut, and the pump and the portion of the tubing attached thereto is detached and discarded.

In one particularly preferred form, a part of the tubing connecting the lens and the pump is received in a channel formed in the main frame of the spectacles, preferably in the side facing the user. The tubing projects from this recess beyond the side of the spectacles to join the pump attached to the arm of the spectacles.

The tubing can be closed in any suitable manner. However, it is preferred for the tubing to be clamped closed, for example by means of a screw urging the sides of the tubing together. In a preferred form, a screw is provided in a passage in the frame of the spectacles, perpendicular to and intersecting the channel in which the tubing is received. On the opposite side of the channel from the screw is a member which extends across the channel in the form of a bridge. When it is desired to close the tubing, the screw is screwed into the passage, and the end of the screw compresses the tubing against the member to close it. The part of the tubing which projects beyond the end of the channel can then be removed, for example by cutting it so that its end lies flush with the side of the frame.

In a particularly preferred embodiment, the member is formed by a part of the hinge attaching the arm to the main frame. This helps to retain the tubing in the channel, and avoids the need to provide a separate member.

As an alternative, the tubing could be closed by compression means other than a screw. For example, the frame may be provided with a button, which when depressed compresses the tubing against a member to close it. The button Way be arranged such that it latches when it is depressed, to ensure that the tubing remains closed. In addition, the button can be provided with means for retaining it in its original position, to prevent accidental operation. These means may take the form of a protuberance on the button, which fits into a corresponding recess in the frame.

In addition, means can be provided in the spectacles to allow the tubing to be cut. For example, a button carrying a blade may be provided, the blade severing the tubing when the button is depressed. This button may be provided separately; however, it is preferred that the button which closes the tubing and the button which cuts it are combined, so that the tubing can be closed and cut in a single movement. This simplifies the process of setting the spectacles to a desired focus.

As mentioned in WO96/38744, the lenses can be pre-filled with fluid during their manufacture. The pumps then need only contain a sufficient amount of fluid to allow the adjustment of the focus of the lenses.

It will be appreciated that it is very important for the lens to be completely filled with fluid, with no air bubbles in the lens. The presence of air bubbles is extremely distracting for the wearer of the spectacles.

A number of approaches can be taken to filling the lens so as to avoid the presence of air bubbles in the filled lens. For example, in one method which has proved effective, some of the air in the envelope of the lens is first sucked out, and then a similar amount of fluid is injected. The cycle of air removal followed by fluid injection is then repeated as necessary until the lens is filled with fluid.

In an alternative method, a needle whose external diameter is less than the internal diameter of the duct is used to inject the fluid. The gap between the needle and the needle allows air in the lens to escape as fluid is injected. Fluid can still be injected through the needle while it is being withdrawn from the duct.

It is also preferred for the fluid used to fill the lens to be degassed prior to filling, to reduce the chance of bubbles forming in the lens after filling.

Filling the lens will normally involve injection of a relatively viscous fluid through a narrow passageway. The filling process can be facilitated by heating the fluid prior to injection, so as to reduce its viscosity.

The variable focus lens described herein may be provided with at least one transparent, protective cover for the or each flexible membrane. The cover may be, for example, a rigid sheet of transparent material, for example glass or a plastics material such as polycarbonate. The protective cover may be mounted, for example bonded, to the ring member or the frame member.

As mentioned above it has been found by the applicant that in order to obtain a desired optical quality of a variable focus lens it is important that the membrane is maintained under tension. For this purpose it is advantageous to form the membrane from a heat-shrinkable plastics material.

Thus, according to an invention disclosed herein, there is provided a method of making a variable focus lens having a flexible, transparent membrane supported in a frame, wherein the membrane is heat treated while held in the frame to increase the tension in the membrane.

It has been found by the applicant that, at least with preferred materials for the membrane, e.g. Mylar, heat treatment of the membrane causes the membrane material to contract and thereby increase the tension in the membrane.

The membrane may be treated using any suitable source of heat, and in a preferred arrangement the heat is provided by a source of hot air, such as a hair dryer, a hot air gun or a fan heater.

According to an invention disclosed herein, there is provided a method of making a variable focus lens having a flexible, transparent membrane supported in a frame, wherein the membrane is pre-tensioned, and the frame is mounted to the membrane while the membrane is pre-tensioned. In this way, a convenient method of ensuring that the membrane is in tension on the frame is provided.

Any suitable means may be provided for pre-tensioning the membrane. For example, the principles for tensioning the membrane disclosed in GB 2184562 and 2183059 may be applied in this novel way to the pre-tensioning of the membrane.

The frame may be a frame as disclosed elsewhere herein.

The variable focus lens described above is of course suitable for use in spectacles. However, it can also be used on any form of eyewear where it may be desired to incorporate corrective optics, including but not limited to sunglasses, swimming goggles, skiing goggles, squash glasses, sports eyewear in general, welding masks, welding goggles, laboratory goggles, and protective eyewear in general. The lens may be provided as an insert, or may have means for attachment to the outside of the eyewear.

If the lens is to be used in sunglasses, then the material of the membranes or the fluid itself could be tinted. Further, it is possible to use metallized Mylar, which reflects a portion of the light incident thereon and transmits the remainder, as the material of the outer membrane, thereby providing reflective sunglasses.

A variable focus lens and spectacles embodying many of the advantageous features described herein and to which the other features described herein may be applied will now be described in detail, by way of example only, with reference to the accompanying drawings, in which.

The lens described and illustrated herein may be utilised in an optical apparatus constructed and arranged to be adjusted as described and claimed in WO96/38744.

Figure 2:
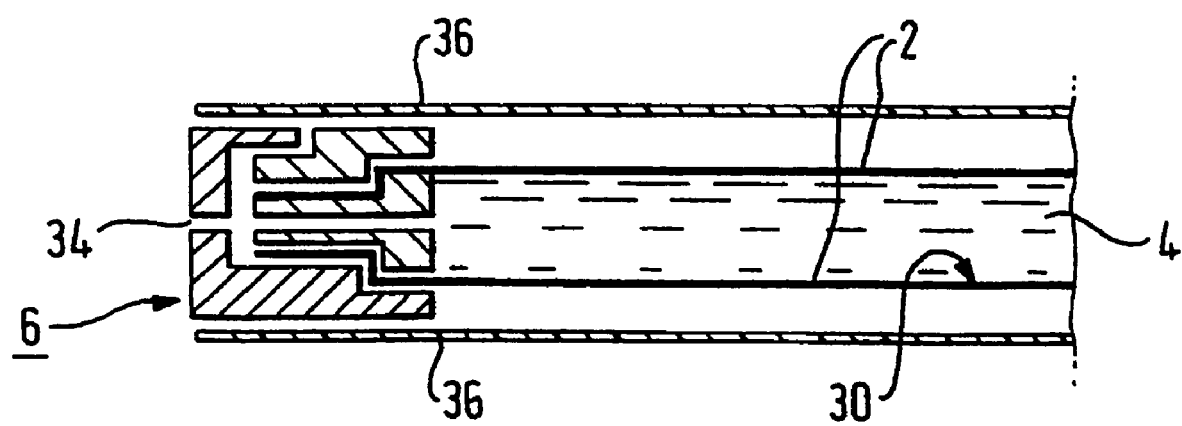
FIG. 2 shows a section similar to that of FIG. 1 but showing the completed lens.

The lens shown in FIG. 2 comprises first and second transparent, flexible membranes 2 which are tensioned and which define therebetween an envelope 30 in which a transparent fluid 4, such as silicone oil, is contained. In the embodiment illustrated the membranes 2 are of Mylar, for example, 23 μm Type D Mylar.

The membranes 2 are held in tension by a support 6. The support 6 defines the periphery of the lens, and of the envelope 30, and is arranged to hold the flexible membranes 2 under tension. The support 6 is also arranged to seal the lens.

Figure 1:
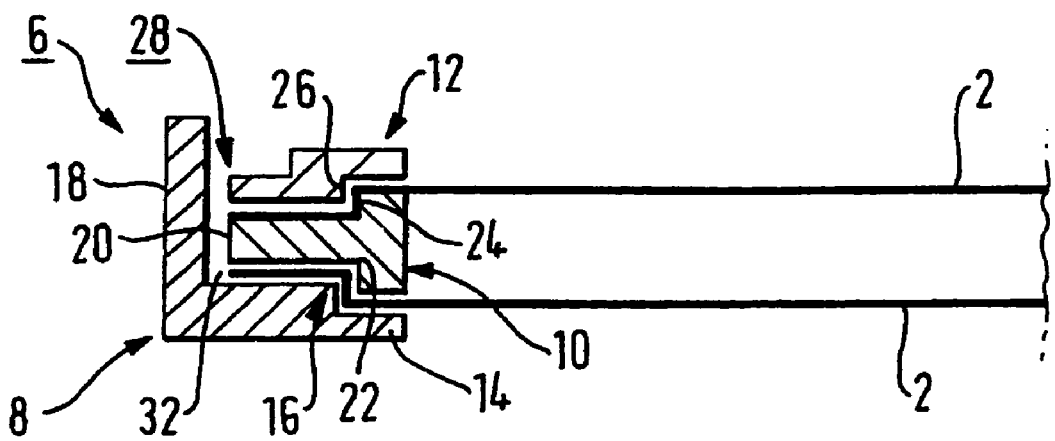
FIG. 1 shows an axial section of a portion of a variable focus lens during construction thereof.

As can be seen from FIG. 1, the support 6 is formed by interengaging a frame member 8 and first and second ring members 10,12 of aluminum. In this respect, the frame member 8 has a radially extending flange 14 which is stepped as indicated at 16. The frame member 8 also has an axially extending rim 18. The first ring member 10 has a radially outwardly projecting portion 20 defining a first step 22 which cooperates with the step 16 of the frame member 8 and a second step 24 which cooperates with a step 26 of the second ring member 12. The second ring member 12 has a recess 28 arranged radially outwardly therein.

Where the completed lens is to have a generally circular periphery, for example, a first membrane 2, which is circular, is positioned to extend within the frame member 8 such that its periphery extends along the radial flange 14 thereof. The first ring member 10 is then supported within the frame member 8 such that the complementary steps 16 and 22 thereof interengage. This interengagement positions the first ring member 10 relative to the frame member 8. The interengagement also bends the peripheral circumference of the first membrane 2 through two different directions as is clearly shown in FIG. 1.

A second circular membrane 2 is then positioned across the frame member 8 such that its periphery extends along the upper radially extending surface of the first ring member 10. Thereafter, the second ring member 12 is positioned such that the steps 24 and 26 of the first and second ring members 10,12 cooperate to retain the second ring member 12 in position within the frame member 8, and to bend the periphery of the second membrane 2 through two directions. The tolerances of the members 8,10,12 are chosen such that even when the arrangement is in the interengaged position shown in FIG. 1, the two membranes 2 are firmly held by the interengaged members.

The construction has the considerable advantage that the circular membranes 2 do not have to be produced to close tolerances. Each circular membrane 2 can be cut to be generally circular and to have a diameter which is somewhat larger than is required. In its turn, each membrane 2 is positioned as described above and held by the interengagement of the corresponding ring members 10, 12. Any excess material of the membrane 2 can then be trimmed simply using a knife with the ring members 10,12 acting as guides.

To complete the construction of the lens it is necessary to ensure that the frame member and the first and second ring members 8,10,12 are secured together such that the peripheries of the membranes 2 are firmly retained to seal the lens and to prevent any leakage from the envelope 30 defined between the two membranes 2. In the embodiment illustrated, the retention of the membranes 2 is achieved by crimping and deforming the frame member 8. In this respect, the upstanding, axially extending, free end of the limb 18 of the frame member 8 is bent over to be received within the recess 28 of the second ring member 12. Any excess material deformed from the ring 8 during this crimping operation is received within an annular space 32 which is defined between the radially outward peripheries of the first and second ring members 10 and 12, and the inner periphery of the limb 18 of the frame member 8.

Once the lens has been constructed, as shown in FIG. 1, and with the frame member 8 deformed to secure the structure, a duct 34 is drilled through the frame 6 into the envelope 30. The envelope 30 can then be filled with the transparent fluid 4 through the duct 34. With 703 silicone oil as the fluid, the resultant lens achieves a focal length range of at least −6 to +10 dioptres, and the range −10 to +10 dioptres should be achievable. Of course, it will be appreciated that, in an alternative embodiment, the rings are formed with ducts before they are assembled.

Fluid may be introduced into the envelope 30 by way of the duct 34 and retained therein by use, for example, of ducts, plugs and sealing means as described in WO96/38744. In an embodiment, the lens is pre-filled at this stage with the fluid 4 and an appropriate material is provided in the duct 34 to seal the envelope 30. However, the material sealing the duct 34 is preferably penetrable by a syringe, for example, so that the pressure of the fluid 4 within the envelope 30 can be adjusted. As an alternative, a self-sealing valve could be positioned in the duct, as described above.

In the embodiment shown, the two axially outer surfaces of the lens are each protected by a sheet 36 of a polycarbonate. Each polycarbonate sheet 36, for example, may be about ½ millimetre thick. It will be appreciated that these sheets 36 are arranged to extend substantially parallel to each other. The circumferential periphery of each of the sheets 36 may be fixed to the annular frame 6 in any appropriate manner. For example, the sheets 36 may be adhered to the frame 6. Additionally and/or alternatively, a plastics material frame (not shown) of a pair of spectacles, for example, may be arranged to receive the annular frame 6 in a manner to retain the sheets 36 against the annular frame 6 in the position of FIG. 2.

Figure 3:
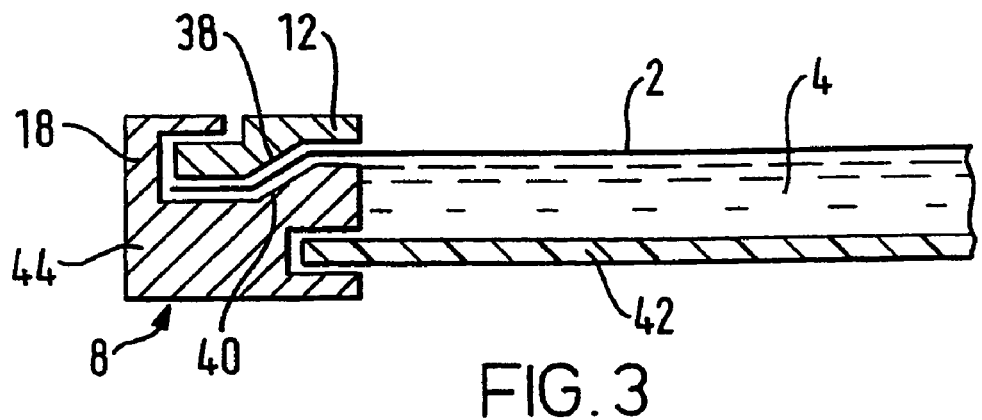
FIG. 3 is a partial sectional view of a variable focus lens.

FIG. 3 shows a fluid-filled lens according to a different arrangement. In this case there is only a single ring member 12 which has an oblique engaging surface 38 complimentary to the oblique engaging surface 40 of the frame member 8. A single flexible membrane 2 is held between these engaging surfaces 38,40, which are urged together by retaining means in the form of a crimped limb 18 of the frame member 8. A wall of the envelope containing the transparent fluid 4 is provided by a polycarbonate window 42 received by the annular part 44 of the frame member 8.

Figure 4:
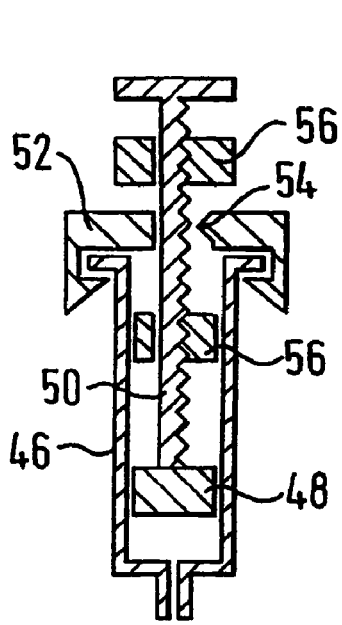
FIG. 4 is a sectional view of a pump for a variable focus lens.

FIG. 4 shows a pump for a variable focus lens in the form of a modified syringe having a barrel 45 and a piston 48 mounted on a piston rod 50. The piston rod 50 is provided along one side with a rack of teeth. A collar 52 is clipped to the rim of the barrel 46 and the shaft 50 passes through a central aperture defined in the collar. A tooth of the collar projects into the aperture and engages the teeth of the shaft 50, such that the shaft 50, and hence the piston 48, is movable stepwise through a series of discrete locations defined by the teeth of the shaft 50.

Stops 56 are clipped to the shaft 50 and have complementary teeth which engage the teeth of the shaft 50 and maintain the stops 56 in position relative to the shaft. The stops 56 engage the collar 52 when the shaft 50 is at either end of the range of movement defined by the stops 56.

Figure 5:
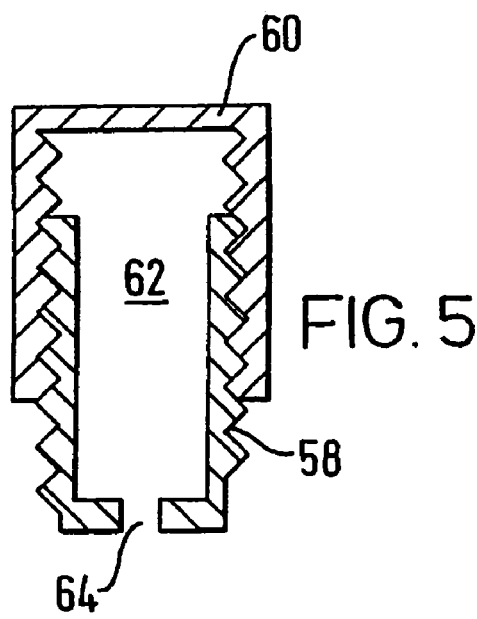
FIG. 5 is a sectional view of another pump for a variable focus lens.

FIG. 5 shows another pump for a variable focus lens. The pump comprises a cylindrical barrel 58 with a threaded exterior and cap 60 with a complementary threaded interior engaging the thread of the barrel 58. Between the barrel and the cap is defined a fluid chamber 62. As the barrel and cap are rotated relative to each other the effective volume of the fluid chamber 62 is varied so that fluid can be forced out of or sucked through a fluid port 64 defined in an end face of the barrel 58.

Figure 6:
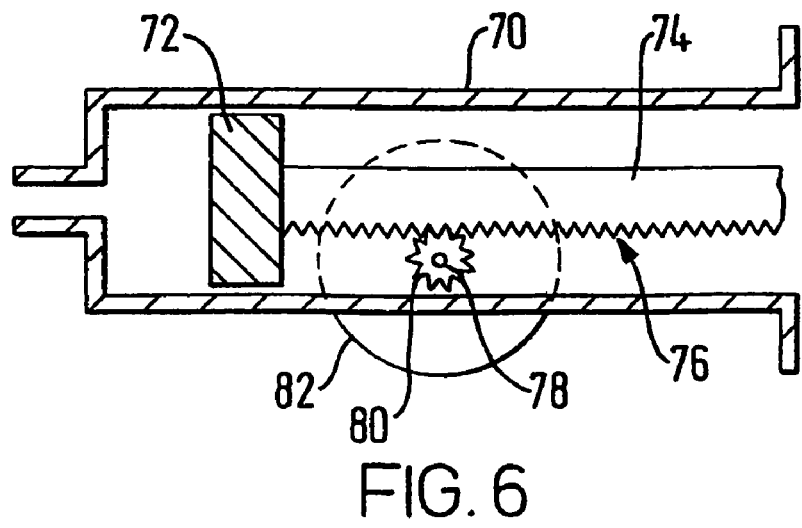
FIG. 6 is a sectional view of another pump for a variable focus lens.

FIG. 6 shows a further pump use with a variable focus lens. Again, this pump is in the form of a modified syringe, having a barrel 70 and a piston 72 mounted on a piston rod 74, which has a rack. 76 of teeth on one side. Passing through the barrel is an axle 78, on which a pinion gear 80 is mounted. The pinion 80 meshes with the rack 76. Attached to an end of the axle, which projects beyond the barrel, is a wheel 82 (partly shown in phantom), which can be rotated by a user. Rotation of the wheel 820 in turn rotates the pinion 80, which drives the rack 76 and thus moves the piston 72 in the barrel 70. Fluid can thus be forced out of and sucked into the barrel, to vary the pressure in the lens, simply by rotating the wheel. Of course, other forms of gearing can be used to link the wheel to the piston rod.

Figure 7:
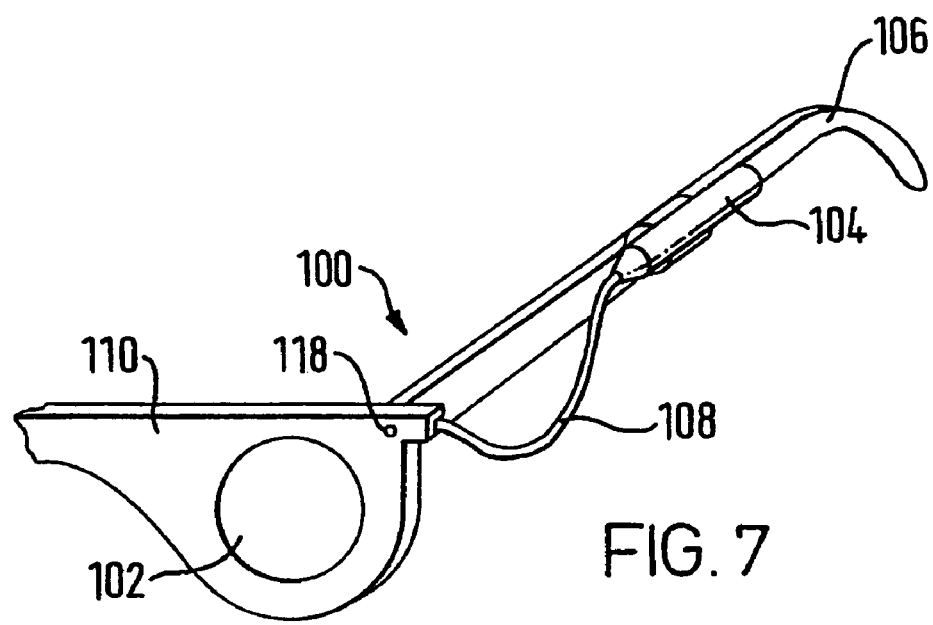
FIG. 7 is a perspective view of part of a pair of spectacles.

FIG. 7 shows a part of a pair of spectacles 100 employing two variable focus lenses. As will be seen, one of the lenses 102 is connected to a pump 104, removably attached to an arm 106 of the spectacles, by a length of tubing 108. The other lens is also provided with a pump in an analogous manner. The pumps can be of the form described above, although it will be appreciated that any suitable form of pump can be used.

Figure 8:
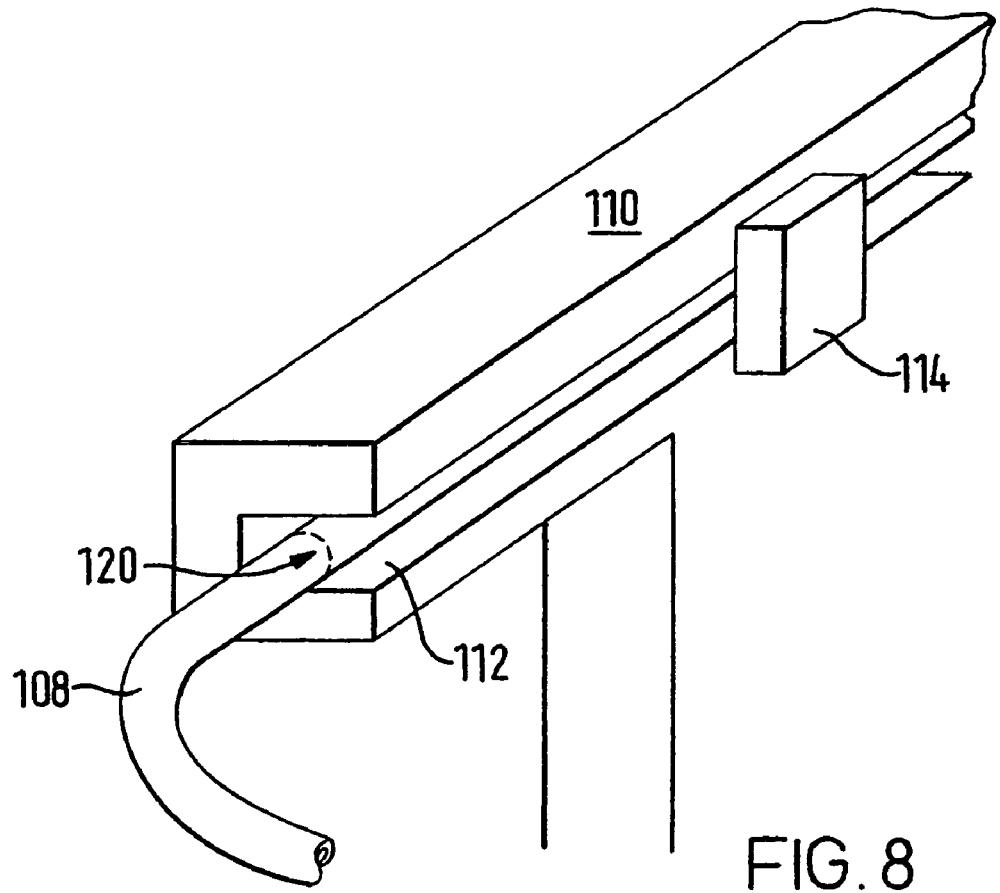
FIG. 8 is an enlarged view of a part of the spectacles.

The area of attachment between the main frame 110 of the spectacles and the arm 106 is shown in more detail in FIG. 8. It will be seen that the tubing 108 extends from the lens through a channel 112 formed in the frame 110 and open towards the rear (ie the side facing the wearer) thereof. Part of the hinge (shown schematically as 114) is fixed to either side of the channel, and extends across it in the manner of a bridge.

Figure 9:
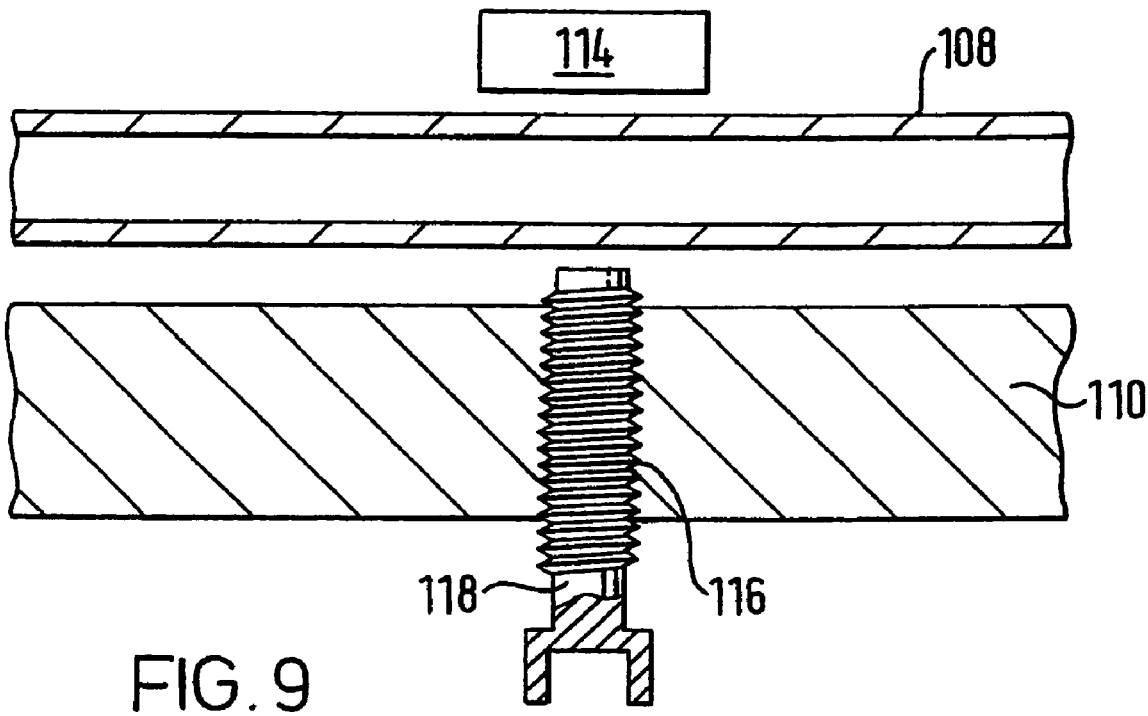
FIG. 9 is a sectional view of part of the spectacles.

The frame also includes a threaded passage 116, as shown in FIG. 9, which accommodates a screw 118. The threaded passage 116 opens into the channel 112, and is aligned with the part 114 of the hinge which bridges the channel.

In use, the pressure inside the lens, and thus its focus, is adjusted by means of the pump 104. When the desired focus has been achieved, the screw 118 is screwed into the passage 116 to close the tubing 108. In particular, the end of the screw 118 clamps the tubing 108 against the part 114 of the hinge which bridges the channel. The screw is preferably screwed in and out by means of an Allen key, although of course any form of screw may be used.

Once the tubing 108 is clamped closed, the pump 104 is detached from the arm 106 of the spectacles, and the tubing is cut as indicated at 120, flush with the edge of the frame 110. The same process is repeated for the other lens.

Figure 10:
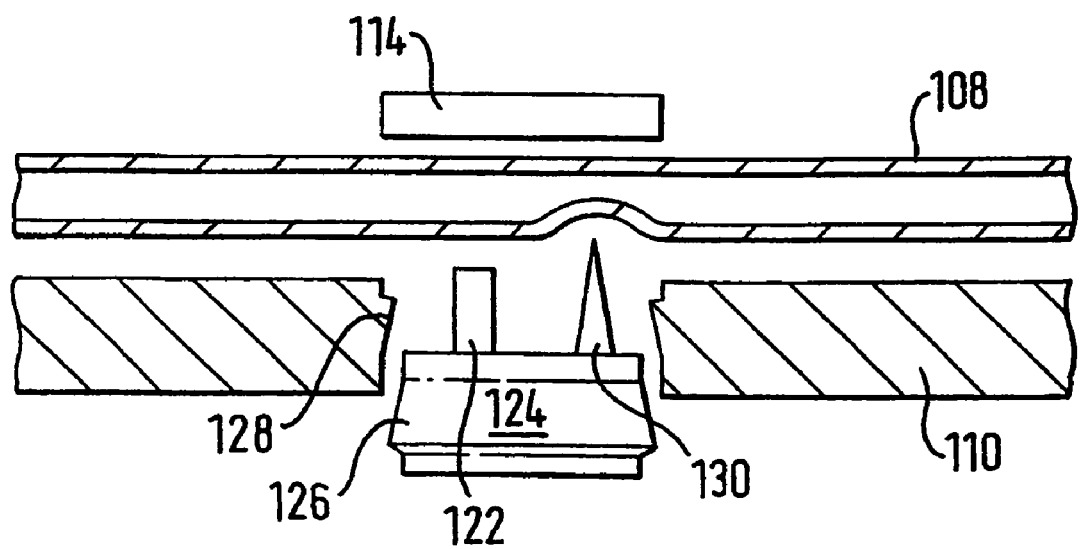
FIG. 10 is a sectional view of part of an alternative pair of spectacles.

An alternative arrangement for closing and cutting the tubing 108 is shown in FIG. 10. Here, the tubing is closed by means of a projection 122 attached to a button 124, which slides in an opening in the frame. When the button 124 is depressed, the projection 122 presses the tubing against the part 114 of the hinge of the spectacles, thus closing it. The button can be provided with means to latch it in its closed position, as shown at 126 and 128. The button can also be provided with means (not shown) to retain it in its original position until it is pressed.

In addition, the button 124 can be provided with a blade 130 for cutting the tubing. The blade 130 and tubing 108 are arranged such that the blade only cuts the tubing after the tubing has been closed by the projection 122. A single depression of the button thus serves to close the tubing and cut it.

The button 124 has been shown in the front face of the frame 110 of the spectacles. However, it will be appreciated that it could also be arranged in the top face of the frame of the spectacles. The member would then bear against a side wall of the channel 112 to close the tubing.

The features described herein may be used either separately or in any suitable combination. It will be appreciated that alterations and modifications may be made to the embodiments described and illustrated herein within the scope of this application.

For example, although the much mention has been made herein of variable focus lenses, the advantageous features described herein may also be applied to other optical devices. For example, by providing a suitable silvered surface in the lens described herein, a mirror of variable focus may be manufactured in accordance with the present disclosure. The silvered surface may be applied to the flexible membrane, or may be applied to a rigid surface viewed through the flexible membrane. Of course, in the case of a silvered flexible membrane, it is not necessary for the fluid within the envelope to be transparent, as light is not required to pass through it in use. Indeed, the optical properties of the fluid in this case are irrelevant and the fluid may be opaque.

The invention claimed is:

1. A variable focus lens comprising a transparent envelope at least partially defined by a flexible, transparent membrane and containing a transparent fluid, a frame member engaging one face of the flexible membrane and a ring member engaging an opposite face of the flexible membrane, the ring member and the frame member being urged towards each other by retaining means, wherein the respective surfaces of the frame member and the ring member that engage the flexible membrane are substantially complementary and profiled so as to cause a peripheral region of the flexible membrane to be bent in more than one direction, wherein the ring member and frame member are shaped to positively engage each other so that the ring member and frame member are secured to maintain the flexible membrane under tension.

2. A variable focus lens as claimed in claim 1, wherein the profiles of the engaging surfaces are stepped.

3. A variable focus lens as claimed in claim 1, wherein the profiles of the engaging surfaces comprise one or more projections and complementary recess(es).

4. A variable focus lens as claimed in claim 1, wherein the material of the ring member and frame member is also lightweight.

5. A variable focus lens as claimed in claim 4, wherein the ring member and frame member are made of a high impact resistant plastics material.

6. A variable focus lens as claimed in claim 4, wherein the ring member and frame member are made of aluminum.

7. A variable focus lens as claimed in claim 4, wherein the ring member and frame member are made of titanium.

8. A variable focus lens as claimed in claim 1, wherein at least one of the surfaces is coated to increase a coefficient of friction of the at least one of the surfaces.

9. A variable focus lens comprising a transparent envelope at least partially defined by a flexible, transparent membrane and containing a transparent fluid, a frame member engaging one face of the flexible membrane and a ring member engaging an opposite face of the flexible membrane, the ring member and the frame member being urged towards each others by retaining means, wherein the respective surfaces of the frame member and the ring member that engage the flexible membrane are substantially complementary and at least one of the surfaces is coated to increase a coefficient of friction of the at least one of the surfaces.

10. A variable focus lens as claimed in claim 8, wherein one or more of the frame member and the ring member is coated to increase a coefficient of friction of the one or more of the frame member and the ring member.

11. A variable focus lens as claimed in claim 1, wherein the ring member and the frame member have a circular, oval, elliptical, or other closed curve, peripheral shape.

12. A variable focus lens as claimed in claim 1, wherein the frame member comprises a rigid transparent window forming a wall of the envelope.

13. A variable focus lens as claimed in claim 12, wherein the rigid window is made of glass or a plastics material such as polycarbonate.

14. A variable focus lens as claimed in claim 13, wherein the frame member is made entirely of such transparent material.

15. A variable focus lens as claimed in claim 12, wherein the rigid window is secured to the frame member by being at least one of bonded to and enclosed by the frame member.

16. A variable focus lens as claimed in claim 1, wherein the frame member is provided with a second engaging surface engaging a second membrane.

17. A variable focus lens as claimed in claim 16, wherein a second ring member is provided with a second engaging surface for engaging the second membrane.

18. A variable focus lens as claimed in claim 16, wherein the second engaging surface is opposed to the first engaging surface of the frame member.

19. A variable focus lens as claimed in claim 16, wherein the second membrane defines a wall of the envelope.

20. A variable focus lens as claimed in claim 1, wherein the first ring member is provided with a second engaging surface engaging a second membrane.

21. A variable focus lens as claimed in claim 20, wherein a second ring member is provided with a second engaging surface for engaging the second membrane.

22. A variable focus lens as claimed in claim 19, wherein the second engaging surface is opposed to the first engaging surface of the first ring member.

23. A variable focus lens as claimed in claim 20, wherein the second membrane defines a wall of the envelope.

24. A variable focus lens as claimed in claim 16, wherein the first and second membranes are formed from a single membrane web.

25. A variable focus lens as claimed in claim 16, wherein the first and second membranes are discrete.

26. A variable focus lens as claimed in claim 1, wherein a duct is provided through a wall of the envelope, which duct is in communication with the envelope.

27. A variable focus lens as claimed in claim 26, wherein said wall is a radially outer wall.

28. A variable focus lens as claimed in claim 25, wherein said duct is formed by a pre-formed bore in one or more of the first or second ring members or the frame member.

29. A variable focus lens as claimed in claim 25, wherein said duct is drilled in one or more of the first or second ring members or the frame member.

30. A variable focus lens as claimed in claim 26, wherein the duct is provided with suitable closure means to prevent leakdye of fluid from the envelope through the duct.

31. A variable focus lens as claimed in claim 30, wherein said closure means take the form of a rubber or elastomer bung penetrable by a needle of a syringe and capable of self-sealing on removal of the needle.

32. A variable focus lens as claimed in claim 30, wherein a valve is provided in the duct, arranged so that the duct is normally closed, but capable of being opened.

33. A variable focus lens as claimed in claim 32, wherein said valve comprises a ball urged by a spring against an annular seat.

34. A variable focus lens as claimed in claim 26, wherein a plurality of ducts are provided in a wall of the envelope.

35. A variable focus lens comprising a transparent envelope at least partially defined by a flexible, transparent membrane and containing a transparent fluid, and a plurality of ducts provided in a wall of the envelope for introducing fluid into the envelope.

36. A variable focus lens as claimed in claim 34, wherein the plurality of ducts are provided with respective closure means.

37. A variable focus lens as claimed in claim 34, wherein the plurality of ducts are provided with a single closure means.

38. A variable focus lens as claimed in claim 34, wherein the ducts are proximately grouped.

39. A variable focus lens as claimed in claim 26, wherein a single duct having a large cross-section is provided.

40. A variable focus lens as claimed in claim 39, wherein the cross-sectional area of the duct is increased by forming the duct such that its width perpendicular to the axis of the lens is greater than its width parallel to the axis of the lens.

41. A variable focus lens as claimed in claim 17, wherein respective retaining means are provided for each of said first and second ring members.

42. A variable focus lens as claimed in claim 1, dependent thereon, wherein the retaining means take the form of a deformable portion of one of the frame member and the ring member, arranged to be deformed over the other of the frame member and the ring member.

43. A variable focus lens as claimed in claim 42, wherein the deformable portion is metal.

44. A variable focus lens as claimed in claim 1, wherein said transparent fluid retained within the envelope is silicone oil.

45. A variable focus lens as claimed in claim 1, wherein the fluid is communicated to the envelope by means of a pump.

46. A method of filling an envelope of a variable focus lens with transparent fluid, in which a needle is used to inject fluid into the envelope through a duct, wherein the external diameter of the needle is smaller than the internal diameter of the duct, such that air in the envelope can escape as fluid is injected.

47. A method of filling an envelope of a variable focus lens with transparent fluid, in which the fluid is heated prior to filling, to reduce its viscosity.

48. A variable focus lens as claimed in claim 1, wherein said lens is provided with at least one transparent, protective cover for the flexible membrane.

49. A variable focus lens as claimed in claim 48 wherein the cover is a rigid sheet of transparent material.

50. A variable focus lens as claimed in claim 49, wherein said material is glass or a plastic.

51. A variable focus lens as claimed claim 1, wherein the flexible membrane is formed from a heat-shrinkable plastics material.

52. A method of making a variable focus lens having a flexible, transparent membrane supported in a frame, wherein the membrane is heat treated while held in the frame to increase the tension in the membrane.

53. A method as claimed in claim 52 wherein heat is provided by a source of hot air, comprising a hair dryer, a hot air gun or a fan heater.

54. A method of making a variable focus lens having a flexible, transparent membrane supported in a frame, wherein the membrane is pre-tensioned, and the frame is mounted to the membrane while the membrane is pretensioned.

55. A variable focus lens comprising an envelope of transparent fluid defined between two membranes, at least one of which is flexible, said flexible membrane being formed from metallized Mylar.

* * * * *